US005744770A

United States Patent [19]
Moessinger et al.

[11] Patent Number: 5,744,770
[45] Date of Patent: Apr. 28, 1998

[54] INDICATING APPARATUS FOR INDICATING A VACUUM

[75] Inventors: Klaus Moessinger, Obersulm; Stefan Kochert, Weinstadt, both of Germany

[73] Assignee: Filterwerk Mann & Hummel GmbH, Ludwigsburg, Germany

[21] Appl. No.: 598,215

[22] Filed: Feb. 7, 1996

[30] Foreign Application Priority Data

Feb. 24, 1995 [DE] Germany .................. 195 06 453.4

[51] Int. Cl.⁶ .................................................. H01H 35/40
[52] U.S. Cl. ................................... 200/83 A; 200/83 P
[58] Field of Search ..................... 200/83 R, 83 A, 200/83 J, 83 N, 83 P, 83 Q

[56] References Cited

U.S. PATENT DOCUMENTS

| 4,369,728 | 1/1983 | Nelson | 116/276 |
| 4,445,456 | 5/1984 | Nelson | 116/268 |
| 4,532,389 | 7/1985 | Woods | 200/83 P |
| 4,616,114 | 10/1986 | Strasser | 200/83 J |
| 4,688,511 | 8/1987 | Gerlach et al. | 116/268 |
| 4,694,127 | 9/1987 | Amuda | 200/83 P |
| 4,843,948 | 7/1989 | Sugiura | 91/369.4 |
| 5,132,500 | 7/1992 | Clew | 200/83 P |

FOREIGN PATENT DOCUMENTS

| 229893 | 7/1997 | European Pat. Off. . |
| 2847278 | 5/1980 | Germany . |

Primary Examiner—Matthew Nguyen
Attorney, Agent, or Firm—Evenson, McKeown, Edwards & Lenahan, P.L.L.C.

[57] ABSTRACT

An indicating apparatus for indicating a vacuum, particularly for indicating the vacuum on the filtered-air side of an air filter for an internal-combustion engine, including a housing and a piston which is movably disposed in the housing and which separates a vacuum area from an anbient-pressure area. A snap element is provided which is activated by the piston and, at a predetermined vacuum, triggers an electric contact.

12 Claims, 2 Drawing Sheets

INDICATING APPARATUS FOR INDICATING A VACUUM

BACKGROUND OF THE INVENTION

This invention relates to an indicating apparatus for indicating a vacuum comprising a housing, a piston movably arranged in the housing, a spring which exerts a force on the piston, and a membrane which seals off a vacuum area on one side of the membrane from an ambient-pressure area on the other side of the membrane.

An indicating apparatus of this type is known, for example, from U.S. Pat. No. 4,369,728. This indicating apparatus is used for indicating the degree of dirt accumulation on an air filter of an internal-combustion engine. Normally, such indicator devices operate with the vacuum which exists on the filtered-air side of the air filter. This vacuum causes the position of the membrane to shift. When the degree of dirt accumulation on the filter increases, the vacuum will naturally rise. This is sensed by the indicating apparatus and converted to an indicating position.

It is a disadvantage of the known system that, because of the design of the membrane and of the piston, a low accuracy is achieved. Also, there is the risk that the detent element of the piston will tilt the piston and cause the piston to jam.

Another indicating apparatus is known from Published German Patent Application No. DE-OS 2,847,278, which operates by means of an electric contact element. A piston or a membrane exerts a force on an electric switch against the pressure of a spring. As soon as the force exceeds a specific amount, this electric switch will open or close and generate a signal. It is a disadvantage of this apparatus that the indication is very dependent on the characteristic spring curve and the elasticity of the piston or of the electric contact.

SUMMARY OF THE INVENTION

It is an object of this invention to provide an indicating apparatus which has a high precision.

A further object of the invention is to provide an indicating apparatus which operates in a reliable manner.

These and other objects of the invention are achieved by providing an indicating apparatus for indicating a vacuum comprising a housing, a membrane which seals off a vacuum area on one side thereof with respect to an ambient pressure area on the other side thereof, a piston associated with the membrane and movably arranged in the housing, and a snap element acted upon by the piston in response to a pressure difference between the vacuum area and the ambient pressure area, the snap element actuating an electric contact when moved by the piston in response to a sufficient pressure difference.

A particular advantage of the invention is the use of a snap element. This snap element has a precisely defined snapping point which is determined by the geometry of the element. When the vacuum rises, the piston will initially exert a force on the snap element without activating the snap element. Only above a predetermined force will the snap element shift into the switching position and thereby generate a defined indicator signal.

In accordance with a further embodiment of the invention, the snap element simultaneously serves as the spring which, when the vacuum is absent, exerts a restoring force to return the piston into the starting position. Advantageously, the snap element is a small rectangular metal leaf which has a planar circumferential edge and is provided with a trapezoidal through-bending in the center region. The advantage of this rectangular element is its precise producibility. Also, with such an element, it is possible to bend this element beyond the snapping point, the further bending occurring essentially linearly in accordance with a characteristic spring curve.

In accordance with another embodiment of the invention, the electric contact for emitting a signal is a reed switch. This switch is switched by means of a magnetic snap element or a magnet arranged on the snap element. Alternatively, the electric contact may be a proximity switch which is uncoupled from this snap element when the snap element is in the inoperative position, and which emits a signal only after the operating stroke of the element or only within the phase in which the snap element has a characteristic linear spring curve.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
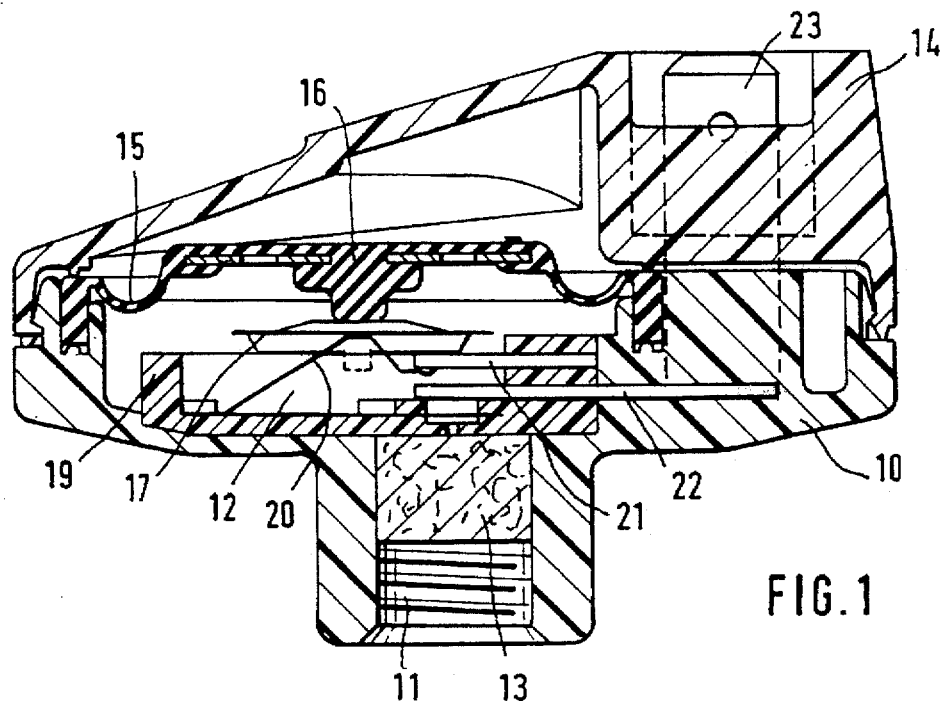
FIG. 1 is a sectional view of an indicating apparatus according to the present invention.

FIG. 1 illustrates an indicating apparatus or a servicing switch for a filter element, such as the air filter element of an internal combustion engine. This indicating apparatus comprises a housing 10 on which a connection 11 for a vacuum source is provided. For example, the connection may communicate with the filtered air side of the air filter of an internal combustion engine, so that the indicator may indicate the degree of dirt accumulated on the filter by sensing the increase in the vacuum on the filtered air side resulting from blocking of the filter by accumulated dirt. The connection 11 also communicates with the housing interior 12. A filter element 13 is provided to prevent dirt from entering the housing interior 12. The housing is closed off by means of a cover 14. A membrane 15 is fastened between the housing and the cover. In the illustrated embodiment, this membrane simultaneously serves as a seal between the housing 10 and the cover 14. As can be seen in FIG. 1, housing 10 and cover 14 are joined by snapping them together around their circumference. An axially movable piston 16 is arranged on the membrane 15. Ambient pressure exists in an ambient pressure area above the piston 16 and the vacuum applied through connection 11 is present in a vacuum area in the housing interior underneath the piston 16. A snap element 17 is also situated in the housing interior 12.

Figure 2:
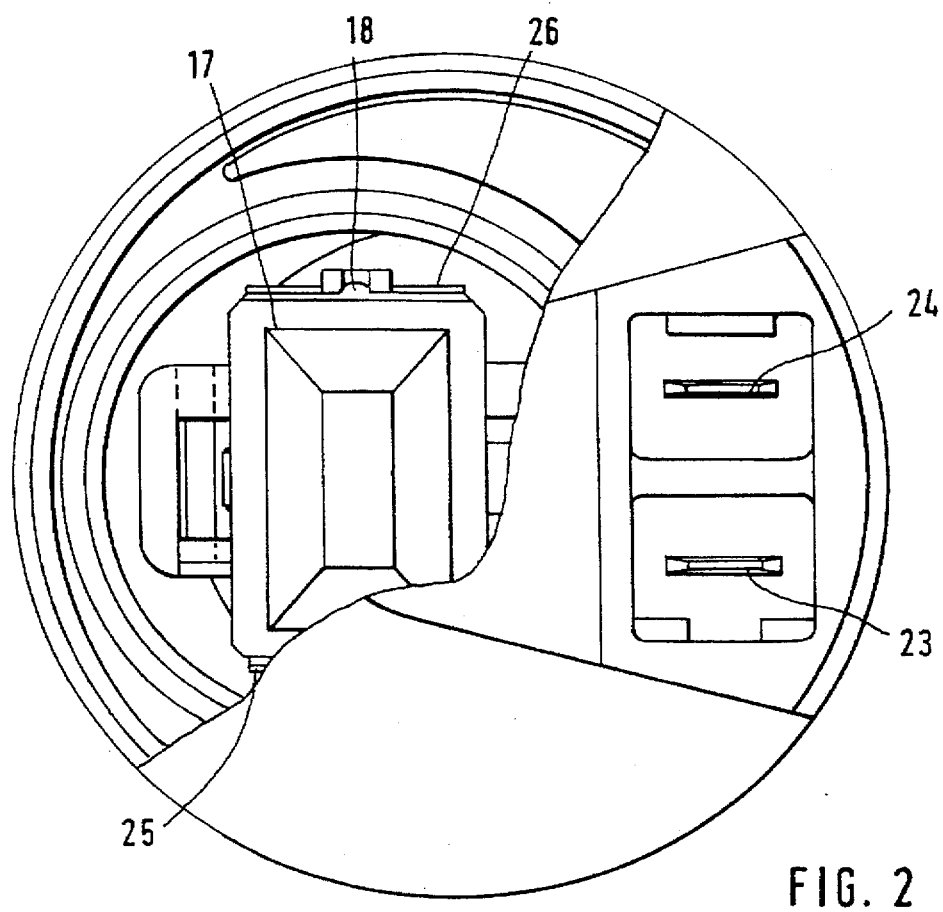
FIG. 2 is a top view of the indicating apparatus of FIG. 1.

The snap element 17 is also illustrated in the top view according to FIG. 2. Snap element 17 has a rectangular design and, on the shorter sides, is fixed by noses 18 against a supporting body 19. The snap element comprises an essentially rectangular leaf or snap plate which has a planar circumferential edge and central depression formed by stamping having a trapezoidal configuration. An electric contact spring 20 is arranged below the snap element 17. In the deactuated position shown in the drawings, contact spring 20 is rests against the support 21. In the activated position, the contact spring 20 rests against the contact plate 22. The contact plate 22 is connected with a first connection pin 23 in an electrically conducting manner. A second connection pin 24 is electrically connected with the electric contact spring 20. As illustrated in FIG. 2, the snap element formed by stamping in such a manner that an essentially rectangular pressure area is formed in the center. As illustrated in FIG. 1, the piston 16 is arranged centrally with respect to the pressure area. Since the snap element is supported only on the outer areas 25 and 26, the snap element can not only snap through, but can also continue to bend (i.e., "bend through") after it has snapped through.

Figure 3:
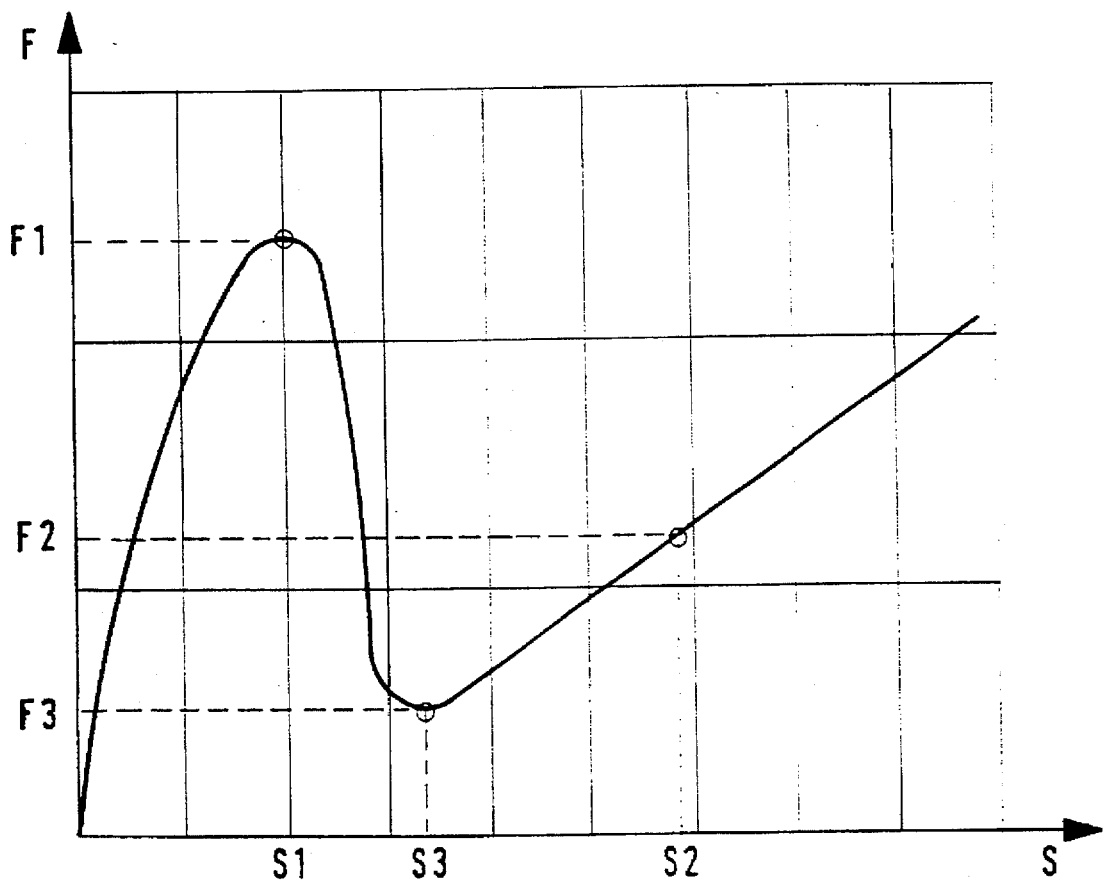
FIG. 3 is a graph of the course of the force of a snap element according to the invention.

The relationship between the force of the vacuum and the movement of the snap element is illustrated in FIG. 3. On the horizontal axis, the path of movement S traversed by the snap element is shown; on the vertical axis, the force F is shown which acts upon the snap element. At the beginning, a very high force is required which, at the maximum point F1, has the result that the snap element snaps through. The snapping-through point is reached in position S3, and when the force is increased thereafter, the through-bending occurs linearly with respect to the supplied force. The switching point S2 is situated in this linear area. This switching point occurs, for example, at a vacuum of 15 mbar. The high precision of the indicating apparatus is achieved by the fact that the linear area which occurs after the snapping, can be determined in a very precise manner. The snapping force F1 can be defined by the depth of the profile stamped into the snap element.

Thus, depending on the particular requirements of a given situation, a servicing switch can be provided which can be optimally adapted to the maximum permissible vacuum.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. An indicating apparatus for indicating a vacuum comprising a housing, a membrane which seals off a vacuum area on one side thereof with respect to an ambient pressure area on the other side thereof, a piston associated with said membrane and movably arranged in the housing, and a snap element acted upon by the piston in response to a pressure difference between the vacuum area and the ambient pressure area, said snap element actuating an electric contact when moved by said piston in response to a sufficient pressure difference, wherein said electric contact comprises a contact spring arranged immediately underneath said snap element and a conductive contact plate into contact with which the snap element, when it snaps through, pushes the contact spring.

2. An indicating apparatus according to claim 1, further comprising a connecting element for connecting the vacuum area to the filtered-air side of an air filter for an internal-combustion engine.

3. An indicating apparatus according to claim 1, wherein a spring member exerts a restoring force on the piston.

4. An indicating apparatus according to claim 3, wherein the snap element simultaneously serves as the spring member which exerts a restoring force on the piston.

5. An indicating apparatus according to claim 1, wherein the snap element comprises an essentially rectangular leaf which has a planar circumferential edge and central depression formed by stamping having a trapezoidal configuration.

6. An indicating apparatus according to claim 1, wherein the electric contact comprises a reed switch.

7. An indicating apparatus for indicating a vacuum comprising a housing, a membrane which seals off a vacuum area on one side thereof with respect to an ambient pressure area on the other side thereof, a piston associated with said membrane and movably arranged in the housing, and a snap element acted upon by the piston in response to a pressure difference between the vacuum area and the ambient pressure area, said snap element actuating an electric contact when moved by said piston in response to a sufficient pressure difference, wherein the electric contact is spaced away from the snap element when the snap element is deactuated and is engaged by the snap element when the snap element is snapped through, and wherein the electric contact is closed by continued bending of the snap element after it has snapped through.

8. An indicating apparatus according to claim 7, wherein after the snap element snaps through it exhibits a substantially linear spring curve during continued bending.

9. An indicating apparatus for indicating a vacuum comprising a housing, a membrane which seals off a vacuum area on one side thereof with respect to an ambient pressure area on the other side thereof, a piston associated with said membrane and movably arranged in the housing, and a snap element acted upon by the piston in response to a pressure difference between the vacuum area and the ambient pressure area, said snap element actuating an electric contact when moved by said piston in response to a sufficient pressure difference, said snap element biasing said piston to a position in which said electric contact is open.

10. An indicating apparatus for indicating a vacuum comprising a housing, a membrane which seals off a vacuum area on one side thereof with respect to an ambient pressure area on the other side thereof, a piston associated with said membrane and movably arranged in the housing, and a snap element acted upon by the piston in response to a pressure difference between the vacuum area and the ambient pressure area, said snap element actuating an electric contact when moved by said piston in response to a sufficient pressure difference, said snap element comprising a rectangular leaf with a planar circumferential edge and a central trapeziodal protruding snap-through portion.

11. An indicating apparatus for indicating a vacuum comprising a housing, a membrane which seals off a vacuum area on one side thereof with respect to an ambient pressure area on the other side thereof, a piston associated with said membrane and movably arranged in the housing, and a snap element acted upon by the piston in response to a pressure difference between the vacuum area and the ambient pressure area, said snap element actuating an electric contact when moved by said piston in response to a sufficient pressure difference, wherein said snap element and an electrical contact member of said electric contact are disposed in said vacuum area.

12. An indicating apparatus for indicating a vacuum comprising a housing, a membrane which seals off a vacuum area on one side thereof with respect to an ambient pressure area on the other side thereof, a piston associated with said membrane and movably arranged in the housing, and a snap element acted upon by the piston in response to a pressure difference between the vacuum area and the ambient pressure area, said snap element actuating an electric contact when moved by said piston in response to a sufficient pressure difference, wherein said snap element when it snaps through, directly engages a spring member and moves the spring member into electrical contact with a conductive plate to close said electric contact.

* * * * *